United States Patent
Lehning

(10) Patent No.: US 9,417,319 B2
(45) Date of Patent: Aug. 16, 2016

(54) METHOD AND ARRANGEMENT FOR DETECTING TRAFFIC VIOLATIONS IN A TRAFFIC LIGHT ZONE THROUGH REAR END MEASUREMENT BY A RADAR DEVICE

(71) Applicant: JENOPTIK Robot GmbH, Monheim (DE)

(72) Inventor: Michael Lehning, Hildesheim (DE)

(73) Assignee: JENOPTIK Robot GmbH, Monheim (DE)

( * ) Notice: Subject to any disclaimer, the term of this patent is extended or adjusted under 35 U.S.C. 154(b) by 228 days.

(21) Appl. No.: 14/136,174

(22) Filed: Dec. 20, 2013

(65) Prior Publication Data

US 2014/0176360 A1 Jun. 26, 2014

(30) Foreign Application Priority Data

Dec. 20, 2012 (DE) .......................... 10 2012 112 754

(51) Int. Cl.
*G01S 13/86* (2006.01)
*G01S 13/42* (2006.01)
*G01S 13/58* (2006.01)
*G01S 13/91* (2006.01)
*G08G 1/04* (2006.01)

(52) U.S. Cl.
CPC .............. *G01S 13/867* (2013.01); *G01S 13/42* (2013.01); *G01S 13/58* (2013.01); *G01S 13/91* (2013.01); *G08G 1/04* (2013.01)

(58) Field of Classification Search
CPC ....... G01S 13/42; G01S 13/58; G01S 13/867; G01S 13/91; G08G 1/04
USPC ............................................................ 342/66
See application file for complete search history.

(56) References Cited

U.S. PATENT DOCUMENTS

| 7,633,433 | B2 | 12/2009 | Behrens et al. | |
|---|---|---|---|---|
| 2006/0269104 | A1* | 11/2006 | Ciolli | G08G 1/052 382/104 |
| 2010/0141479 | A1* | 6/2010 | Arnold | G08G 1/01 340/936 |
| 2011/0187580 | A1 | 8/2011 | Laenen et al. | |
| 2014/0195138 | A1* | 7/2014 | Stelzig | G08G 1/0116 701/119 |

FOREIGN PATENT DOCUMENTS

DE 10 2012 107 444 B3 3/2013
EP 2 048 515 A1 4/2009

* cited by examiner

*Primary Examiner* — Timothy A Brainard
(74) *Attorney, Agent, or Firm* — Duane Morris LLP

(57) ABSTRACT

The invention is directed to a method and an arrangement for detecting a traffic violation in a traffic light zone through rear end measurement by a FMCW radar device. For this purpose, a vehicle driving through a radar beam of a FMCW radar device, whose first outer edge beam horizontally forms an obtuse angle with the roadway edge, is measured at its front end, flank and rear end. The vehicle length is determined from the obtained measurement signals and added to the specific radial distance of the vehicle, which is determined close to a stop line through the vehicle rear, and a prediction is made based on the vehicle speed about the vehicle front driving over the stop line.

10 Claims, 3 Drawing Sheets

METHOD AND ARRANGEMENT FOR DETECTING TRAFFIC VIOLATIONS IN A TRAFFIC LIGHT ZONE THROUGH REAR END MEASUREMENT BY A RADAR DEVICE

RELATED APPLICATIONS

The present application claims priority benefit of German Application No. DE 10 2012 112 754.9 filed on Dec. 20, 2012, the contents of which are incorporated by reference in its entirety.

FIELD OF THE INVENTION

The invention is directed to a method and an arrangement for monitoring a trafficway for the purpose of detecting traffic violations in a traffic light zone, i.e., in a region which is defined by stop lines and through which it is permissible or prohibited to drive depending on the switching of a traffic signal installation. A method of this kind is known generically from EP 2 048 515 A1. Features of a generic device are also shown in the aforementioned patent.

BACKGROUND OF THE INVENTION

The known methods and arrangements for monitoring trafficways are generally distinguished by the use of different types of sensors which are either embedded in the pavement of the roadway (invasive sensors) or are arranged above the roadway (noninvasive sensors). Invasive sensors require a high outlay for installation and must be exchanged from time to time depending on the wear of the roadway pavement. Moreover, they are not suitable for stationary arrangements. The trafficway monitored by them is limited by the arrangement of the embedded sensors.

In EP 2 048 515 A1, instead of embedding a sensor at a predetermined location in each individual lane of the multiple-lane roadway, a radar beam is directed substantially horizontal to the roadway and along the edge of the roadway across all of the lanes of the roadway. For this purpose, an angle-resolving radar device (FMCW radar device) for transmitting and receiving radar radiation is positioned relative to the roadway such that it transmits a radar beam forming a radar lobe with an aperture angle of 20° to 40° at a horizontal mounting angle of the radar beam axis (line of symmetry of the radar lobe) relative to the roadway edge of less than 45°. The radar device can be arranged in such a way that when driving through the radar lobe the vehicles drive toward the radar device (oncoming traffic, front-measuring radar device) or away from the radar device (receding traffic, rear end-measuring radar device). In so doing, the monitored trafficway is determined with respect to its position and size by the position of the radar beam axis and the aperture angle of the radar lobe.

According to EP 2 048 515 A1, cited above, the changing relative position of the vehicle with respect to the radar device over the measurement duration is derived from the radar signals reflected by a vehicle as it drives through the radar lobe. When the relative position of the stop line to the radar device is known, the relative position of the vehicle to the radar device can be used to determine its perpendicular distance from the stop line. Subsequently, the time point at which the stop line is passed can be deduced from the vehicle speed in question which has also been derived and from its perpendicular distance from the stop line, and a photograph is taken if this time point does not occur within the green-light phase of a traffic signal installation associated with the stop line.

The position of the vehicle associated with every measurement time is defined here by the position of a so-called point of impingement for which a distance and an angle are determined from the reflection signals.

For oncoming traffic for which only the front end of the vehicle lies in the reflection region of the radar beam with increasing proximity to the stop line, the aforementioned method allows a reliable detection of traffic violations at a traffic signal installation, since the front end of the vehicle, which is naturally the first to pass the stop line, substantially determines the position of the so-called point of impingement.

For receding traffic for which only the rear end of the vehicle lies in the reflection region of the radar beam with increasing proximity to the stop line and the rear end of the vehicle accordingly substantially determines the position of the so-called point of impingement, there is no detection of traffic violations in which the front end of the vehicle but not the rear end of the vehicle passes the stop line at a point in time depending on a given switching state of the traffic signal installation.

A method is known from the not prior published DE 10 2012 107 444 B3 in which vehicles are measured multiple times while driving through a radar lobe and specific position values are formed so as to be associated with measurement times. A specific position value can be a specific radial distance or a specific object angle. The change in the specific position value over time is examined over the length of a segment for the occurrence of a discontinuity. The length of the segment depends upon the length of the vehicle and makes classification possible.

OBJECT OF THE INVENTION

It is an object of the invention to find a device and a method for facilitating a prediction about the front end of a vehicle driving over a stop line with a rear end-measuring radar device.

This object is achieved by a method for detecting traffic violations by vehicles in a traffic light zone by measurement of the rear end of vehicles in which a measurement time-dependent specific position value and the vehicle speed are derived at a plurality of measurement times from measurement signals caused by reflection from one of the vehicles when driving through an observation zone covered by radar radiation, and based on the specific position value which changes over the course of driving through the observation zone and on the vehicle speed it is determined whether or not a stop line lying within the observation zone and associated with a traffic signal installation was driven over by the vehicle outside of a green-light phase of the traffic signal installation so that, if required, a camera is triggered at least once for producing at least one evidentiary photograph. It is essential to the invention that, for this purpose, a FMCW radar device having at least one radar sensor which sends radar radiation at an aperture angle between two outer edge beams and which receives a plurality of measurement signals within a measurement duration at a plurality of measurement times, wherein a radial velocity and, as position value, a radial distance and a specific object angle can be derived at each measurement time, be positioned and aligned next to a roadway with a roadway edge such that the observation space completely covers the stop line and the first of the two edge beams forms a horizontal, obtuse angle with a segment of the roadway edge extending in driving direction.

The vehicle length is derived from the specific position values and is added to the specific radial distance that is determined only from the position of the rear end of the vehicle to an increasing extent as the stop line is approached. A corrected specific radial distance $r_{corr}$ formed in this way is then used to determine a crossing of the stop line by the vehicle so that, in spite of rear end measurement, a prediction is made about the front end of the vehicle driving over the stop line.

The specific position values are advantageously stored as a function over a measurement duration comprising the measurement times. The function has a plurality of segments in which the position values are derived from measurement signals caused by different surfaces in changing relative position to the radar beam. Over a first segment, a reflection takes place only at the vehicle front, over a second segment reflection takes place at the vehicle front and increasingly at a vehicle flank, over a third segment reflection takes place only at the vehicle flank, over a fourth segment reflection takes place at the vehicle flank and the vehicle rear, and over a fifth segment reflection takes place only at the vehicle rear. The transitions between the second segment and third segment and between the third segment and fourth segment are detected, the length of the third segment is determined, and the vehicle length is calculated from the length of the third segment by means of the determined vehicle speed.

Alternatively, a vehicle model can advantageously be modeled from the specific position values and, after normalizing by means of the determined vehicle speed, compared with existing comparison models whose vehicle length is known, and the vehicle length is derived by assigning the modeled vehicle model to the comparison model most similar to it.

The specific position value for each measurement time can advantageously be formed by calculating a specific value of the radial distances associated with this measurement time.

Alternatively, the specific position value for each measurement time can advantageously be formed by calculating a specific value of the object angle associated with this measurement time.

The specific value can advantageously be produced by forming the arithmetic mean value.

The above-stated object is met for a device for detecting traffic violations by vehicles in a traffic light zone through measurement of the vehicle rear by a FMCW radar device with at least one radar sensor and a camera, wherein the FMCW radar device is so configured and is arranged and aligned in such a way at a perpendicular, horizontal installation distance next to a roadway edge with a stop line that a radar beam which proceeds from the FMCW radar device and is limited by two outer edge beams covers an observation space which completely encloses a stop line on the roadway. It is essential to the invention that the first of the two edge beams forms an obtuse horizontal angle with a portion of the roadway edge extending in driving direction so that the vehicle is acquired initially by measurement of the front end of the vehicle as it drives through the observation space.

In an advantageous manner, an aperture angle formed by the two outer edge beams is greater than 90°, in particular greater than 95°, and most advantageously is approximately 120°.

It is advantageous when the FMCW radar device comprises exactly one radar sensor and the radar radiation accordingly forms a radar lobe whose edge beams present the outer edge beams of the radar radiation so that the observation space is completely covered.

Alternatively, the FMCW radar device can comprise a plurality of radar sensors so that the radar radiation is formed by a plurality of radar lobes which are rotated horizontally by an angular offset (ε) relative to one another. They can be adjacent to one another so that the observation space is also completely covered in this way. But it can also be advantageous when they are not adjacent to one another so that partial areas of the observation space are not covered. In this way, energy can be saved in that the observation space is covered in an energy-efficient manner only partially in regions that are relevant for the measurement.

BRIEF DESCRIPTION OF THE DRAWINGS

The invention will be described more fully in the following with reference to embodiment examples. The accompanying drawings show.

DESCRIPTION OF THE EMBODIMENTS

Figure 1:
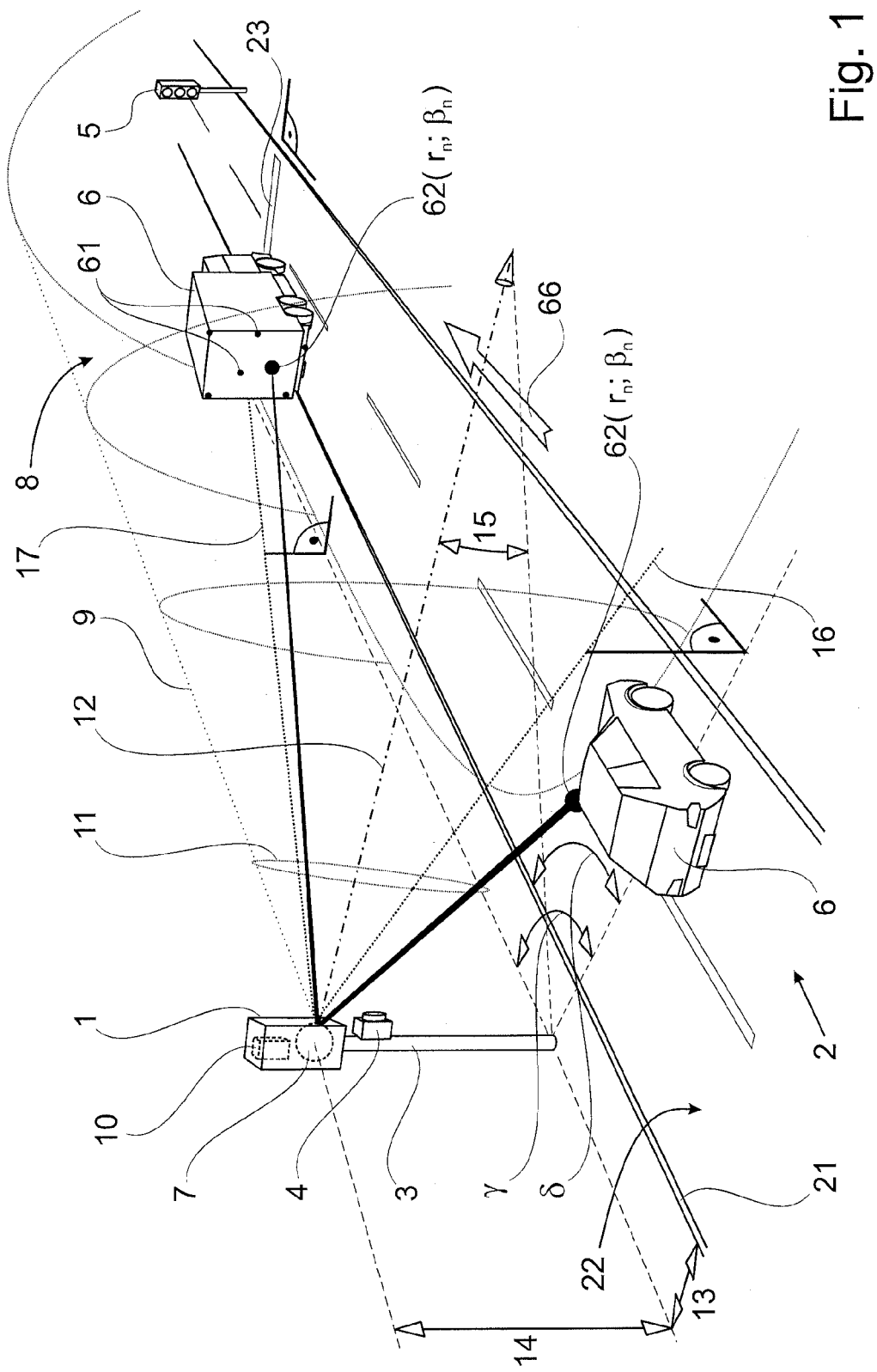
FIG. 1 is a schematic view of a first embodiment example of a device in which the observation space is covered by radar radiation coming from a radar sensor.

A FMCW (Frequency Modulation Continuous Wave) radar device 1 known from the art, advantageously a FSK (Frequency Shift Keying) radar device, a special type of FMCW radar device 1 by which a plurality of vehicles 6 can be simultaneously acquired and also tracked, is used for the method for detecting traffic violations in a traffic light zone by one or more vehicles 6 traveling on a roadway 2. By means of at least one radar sensor 7, the FSK radar device emits radar radiation 11 on at least two alternating carrier frequencies and receives measurement signals (Doppler signals) caused by reflection of the at least two alternating carrier frequencies by the acquired vehicles 6. A good resolution between a plurality of vehicles 6 corresponding to the radial distances and object angles (Cartesian distance coordinates) thereof and radial velocities relative to the FMCW radar device 1 is made possible within a short measurement duration in that frequency shifts between and within the at least two carrier frequencies reflected by the vehicles 6 are evaluated by means of a signal processing unit 10 comprised by the FMCW radar device 1.

The radar radiation 11 coming from the FMCW radar device 1 is limited by two outer edge beams 16, 17 which form an aperture angle γ with one another. The bisector of the aperture angle γ is the radar axis 12.

According to a first embodiment example, as is shown in FIG. 1, the FMCW radar device 1 comprises exactly one radar sensor 7, and the radar radiation 11 forms a radar lobe 9 emitted by this one radar sensor 7, the edge beams of this radar lobe 9 forming a first outer edge beam 16 and a second outer edge beam 17.

Fundamentally, the position and orientation of the FMCW radar device 1 relative to the roadway 2 and a stop line 23 located thereon must be known in order to carry out the method according to the invention. In particular, the horizontal perpendicular distance of the stop line 23 from the FMCW radar device 1 must be known. This knowledge can also be obtained immediately before carrying out the method in that it is learned by the FMCW radar device 1.

FIG. 1 shows a practical installation of the FMCW radar device 1 to illustrate possible positions and orientations that may be occupied by the FMCW radar device 1 relative to the roadway 2.

The FMCW radar device 1 is arranged alongside the roadway 2 so as to be mounted on a mast 3 at a horizontal, perpendicular installation distance 13 to a roadway edge 21 and at a height by a vertical, perpendicular installation distance 14 relative to a roadway surface 22, The FMCW radar device 1 is oriented horizontally in such a way that the radar radiation 11 is radiated substantially in driving direction 66 of the vehicles 6 driving on the roadway 2 and covers an observation space 8 above the roadway 2, which observation space 8 encloses the stop line 23 on the roadway 2 and covers a, region of the roadway 2 in which the vehicles 6 move toward the stop line 23. In so doing, the first outer edge beam 16 horizontally forms an obtuse angle δ with a portion of the roadway edge 21 extending in radiating direction of the FMCW radar device 1. The vertical orientation of the FMCW radar device 1 is defined by a vertical angle 15 formed by the radar axis 12 and the roadway surface 22. The second outer edge beam 17 forms an acute angle with the roadway edge 21 depending on the horizontal, perpendicular installation distance 13 so that the stop line 23 lies in the observation space 8. With a horizontal, perpendicular installation distance 13 of virtually zero, the acute angle can pass into parallelism with the roadway edge 21.

Further features for an acquired vehicle 6 such as a vehicle angle α, a lane, a vehicle acceleration and a vehicle speed can be derived from the position and orientation of the FMCW radar device 1 and from the determination of measurement values (radial velocity, radial distance and object angle) which are produced from and directly derivable from the measurement signals.

The lane describes at every measurement time $t_n$ the actual direction of travel of the vehicle 6 on the roadway 2 which does not coincide with the direction of the radial distance from the FMCW radar device 1 and, further, e.g., due to the vehicle 6 changing lanes, need not necessarily correspond to the directional path of the roadway 2 or the driving direction 66 generally determined for this purpose which runs parallel to the roadway edge 21.

At the same time, conclusions can be drawn from the lane with respect to the vehicle angle α formed at the individual measurement times $t_n$ by the longitudinal axis of the vehicle 6 viewed in driving direction 66 with the direction of the radial distance from the FMCW radar device 1.

The vehicle speed is the actual speed at which the vehicle 6 travels on the roadway 2.

If the measurement signals coming from a vehicle 6 are reduced to the reflection at an individual point reflector for purposes of simplifying the description of the invention, the radial distance corresponds to the direct distance of the point reflector from the center point of the radar sensor 7 of the FMCW radar device 1 emitting the radar radiation 11, the radar axis 12 of the radar lobe 9 also passing through this center point. The radial distance can be derived directly from a measured phase shift between the reflection signals of the at least two carrier frequencies of the FMCW radar device 1. Since the FMCW radar device 1 is arranged outside the roadway 2 at an angle to the roadway edge 21 and to the surface of the roadway 2, the radial velocity is only the velocity component of the real vehicle speed that is detected through the approach of the point reflector (in direction of the radial distance) taking place directly toward the FMCW radar device 1.

Object angle refers here to the angle formed in the center of the radar sensor 7 of the FMCW radar device 1 emitting the radar radiation 11 between the radar axis 12 of the radar lobe 9 and the direct connection between the point reflector and the center of the radar sensor 7 (direction of radial distance). It will be clear to the person skilled in the art that this represents a simplification so as not to complicate the description of the invention unnecessarily by introducing an axis of an angle-resolving receiver unit extending parallel to and negligibly close to the radar axis 12.

In addition to the FMCW radar device 1, the device according to the invention also includes at least one camera 4 which is advantageously arranged together with the FMCW radar device 1 vertically one above the other on the mast 3.

In order to prepare for the detection of traffic violations, the FMCW radar device 1 is positioned relative to the roadway 2 such that the vehicles 6 move through the radar lobe 9 and measurement signals occurring on surfaces of the vehicles 6 which are impinged by radar radiation 11 and which reflect radar radiation 11 can be acquired. The reflecting surfaces of the vehicles 6 may be conceived as a plurality of minireflectors. The minireflectors are very small surface portions of the vehicle 6 whose surface extension and surface orientation relative to the radar radiation 11 can generate a measurement signal. A measurement signal of sufficient intensity to be detected will occur at surface portions of the vehicle 6 in which a plurality of minireflectors lie close together spatially. A clustering of minireflectors such as this is taken together as the directly derivable measurement values are received and is referred to as a rough target 61. The quantity of rough targets 61 which are presented by a vehicle 6 and which contribute to the formation of the measurement signal proceeding from the vehicle 6 increases as it approaches the FMCW radar device 1 and decreases as it moves away from the FMCW radar device 1. Rough targets 61 frequently occur, for example, at highly reflective elements such as vehicle license plates, exterior mirrors or door handles of the vehicles 6.

The FMCW radar device 1 can be positioned in proximity to the ground, e.g., at the typical height of the wheel axles of the vehicles 6, next to the roadway edge 21 with the radar axis 12 oriented horizontally parallel to the roadway surface 22. Accordingly, the vertical angle 15 with respect to the roadway surface 22 is 0° and need not be considered further in calculating other evaluable features. The FMCW radar device 1 is so oriented horizontally 14 with respect to the roadway edge 21 that the first outer edge beam 16 forms an obtuse angle δ of greater than 95°, e.g., 120°, with the roadway edge 21. Accordingly, the vehicles 6 are first detected when entering the radar lobe 9 only by reflection signals coming from the vehicle front 63. Later, measurement signals coming from the vehicle flank 64 are increasingly detected until measurement signals come only from the vehicle flank 64 and no longer from the vehicle front 63. Still later, measurement signals come increasingly from the vehicle rear 65 until measurement signals come almost only from the vehicle rear 65 before the stop line 23 is reached.

It is also possible to arrange the FMCW radar device 1 on the mast 3 at a greater height relative to the roadway surface 22. This offers the advantage that there is less mutual shadowing of vehicles 6 driving simultaneously through the radar lobe 9.

Subsequently, a radar beam 11 forming a radar lobe 9 is emitted by the FMCW radar device 1 and the measurement signals generated by the vehicles 6 through reflection are acquired at a plurality of measurement times t by the FMCW radar device 1.

In order to produce a sufficient separation of detected measurement signals from the background noise that is naturally detected at the same time and in order to improve unambiguity in the signal detection, a threshold value is determined for the signal intensity, which threshold value must be exceeded by the measurement signal in order to be used for further signal processing.

In principle, the threshold value can also be defined by the sensitivity limit of the radar sensor 7, which sensitivity limit is technically determined and cannot be actively assigned.

Figure 2:
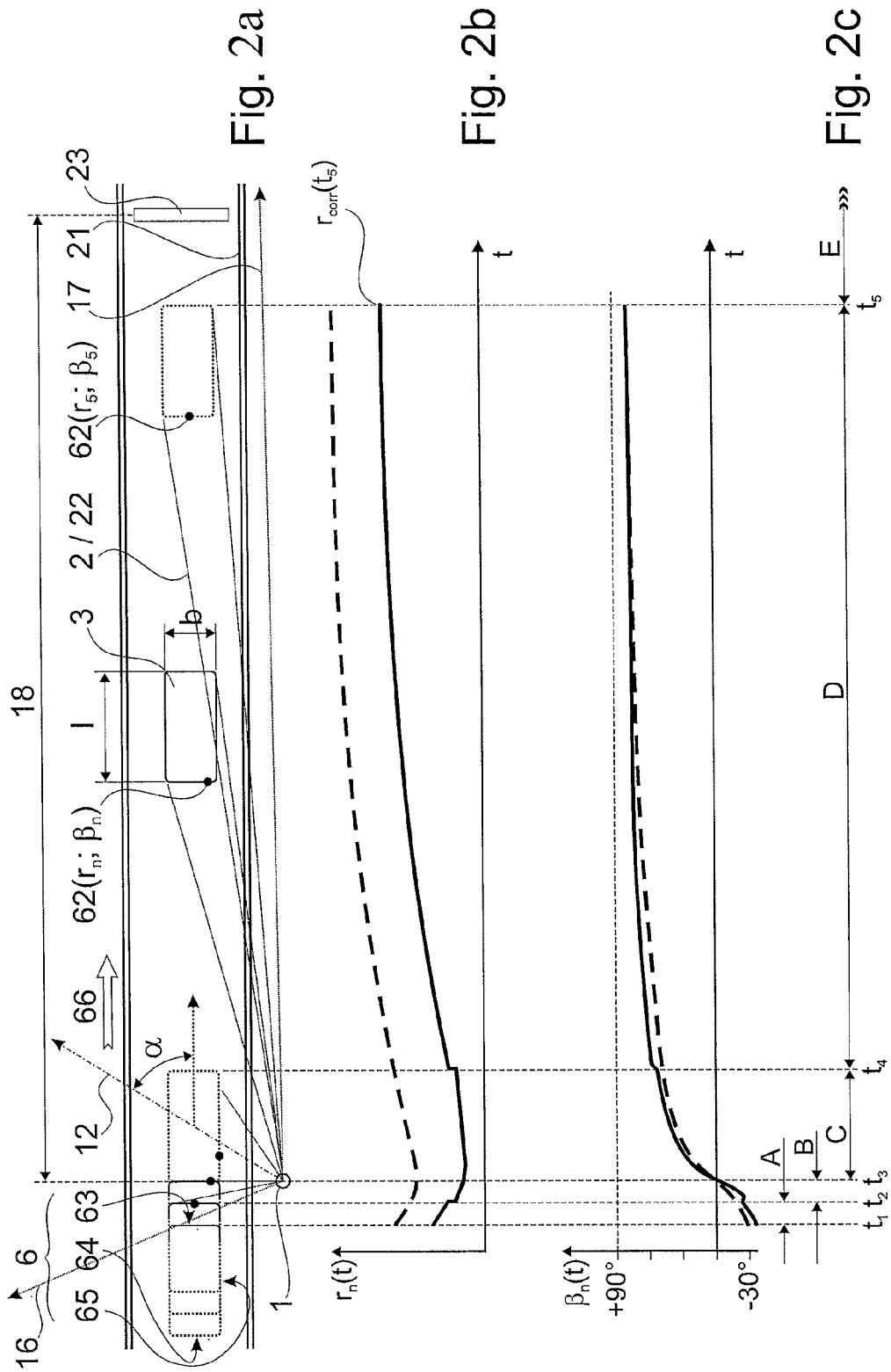
FIG. 2a is the basic procedure for acquiring raw targets at a vehicle moving through the observation space.
FIG. 2b is a distance-time graph.
FIG. 2c is an object angle-time graph.

As is shown in FIG. 2a reduced to five measurement times $t_n$, the detection of measurement signals takes place during the passage of the vehicle 6 through the radar lobe 9 at a plurality of measurement times $t_n$. The interval between the measurement times $t_n$ can be adapted depending on the required resolution of the measurement and the technical specifications of the FMCW radar device 1, particularly of the radar sensor 7 and the associated signal processing unit 10.

A radial distance, an object angle and a radial velocity (collectively referred to as measurement values) are derived respectively for a plurality of rough targets 61 from the measurement signals acquired at a measurement time $t_n$. The radial distances and the object angle are position values. They are then stored so as to be associated with a vehicle 6 taking into account as far as possible a maximum possible spread of the measurement values for possible rough targets 61 on a vehicle 6. Since the measured values include the position values of the rough targets 61, there can be a unique assignment simultaneously to a plurality of vehicles 6 passing through the radar lobe 9. The assignment can be based on similarities of the directly derivable measurement values of the rough targets 61. Rough targets 61 which are hardly distinguishable with respect to radial velocity, radial distance and object angle can be assigned to one and the same detected vehicle 6 with high probability. If this assignment can be applied over a plurality of measurement times $t_n$, the probability increases exponentially so that the assignment already has a high reliability after a few intervals. When at least some of the measurement signals—and, therefore, at least a partial amount from all of the acquired rough targets 61—have been uniquely assigned to a vehicle 6 at a plurality of measurement times $t_n$, the prerequisite has been created for tracking the corresponding vehicle 6 as it continues through the radar lobe 9 and also assigning to this vehicle 6 further detected rough targets 61 having the characteristics corresponding to the partial amount.

A specific position value 62, in this case a specific radial distance $r_n$ is formed in each instance from the derived radial distances associated with a vehicle 6 and a measurement time $t_n$ with the same computation rule. Various computation rules can be considered for this purpose.

For example, the specific position value 62 is determined at each measurement time $t_n$ from the arithmetic mean of all radial distances or all object angles of the rough targets 61 acquired from this vehicle 6. Instead of a computation rule for averaging, the specific position value 62 could also be formed by a different computation rule.

The forming of the specific radial distances $r_n$ as specific position values 62 based on radial distances is illustrated in FIG. 2a and is described more fully in the following description.

After forming the specific position values 62, the vehicle 6 is embodied at every measurement time $t_n$ by the specific position value 62 and can be reduced to this during signal processing. The specific radial distance $r_n$ and the specific object angle $\beta_n$ can then be determined as the specific position values 62 and stored in exactly the same way as for the individual rough targets 61. The measurement values determined for the specific position values 62 can likewise be used for calculating the further evaluable features (driving direction and vehicle speed) of the vehicle 6.

The evaluation of the specific position values 62 for determining the vehicle length 1 is critical to the invention. For this purpose, the specific position values 62 formed at measurement times $t_n$ during the passage of the vehicle 6 through the radar lobe 9 are stored as a function over the measurement duration encompassing measurement times $t_n$. A function of the specific radial distance $r_n(t)$ over time t and a function of the specific object angle $\beta_n(t)$ over time t can be formed and evaluated. In this regard, over the course of the functions two changes are noted which are reflected in a brief change in slope on the graph of the functions. These changes take place in one instance over the duration in which the vehicle flank 64 starts to reflect until only the vehicle flank 64 reflects and, in the other instance, over the duration in which the vehicle rear 65 begins to reflect until only the vehicle rear 65 reflects.

For the sake of clarity, the curve of the functions shown in FIG. 2b and FIG. 2c is not true to scale and is highly exaggerated. As has already been described, the specific position value 62 for a measurement time $t_n$ according to the first embodiment example is formed from the radial distances of all of the rough targets 61 acquired for the vehicle 6 at this measurement time $t_n$. Depending on the vehicle angle α formed at a measurement time $t_n$ by the lane of the vehicle 6 relative to radar axis 12 when passing through the radar lobe 9, the acquired rough targets 61 change continuously, i.e., identical rough targets 61 as well as different rough targets 61 are acquired at the individual measurement times $t_n$ so that the point to which the specific position value 62 can be assigned with a specific radial distance $r_n$ and a specific object angle $\beta_n$ is not a fixed point on the vehicle 6 but rather moves on the surface of the vehicle 6, which is expressed in a noticeable change in the function particularly during the transition to the corners of the vehicle. The functions can be described by five segments. This will be explained with reference to FIGS. 2a to 2c.

For the sake of simplicity, the drawings and description will leave aside the fact that the FMCW radar device 1 does not receive any measurement signals in the form of Doppler signals from the reflection surfaces whose movement has no radial component relative to the FMCW radar device 1 (dead zone of FMCW radar device 1). The dashed lines in FIGS. 2b and 2c represent the idealized curve of the function when the vehicle 6 is reduced to a point reflector. The real curve of the function is shown below this for the sake of clarity.

At measurement time $t_1$, the vehicle 6 enters the radar lobe 9 by the front left-hand corner of the vehicle front 63 and only surfaces of the vehicle front 63 are acquired by the radar beam 11 up to time $t_2$ (segment A of the function). Accordingly, the rough targets 61 can also only be formed by these surfaces (e.g., the license plate, the radiator grille, the part of the trunk extending over the cab) so that the detected radial distances at and between these measurement times ($t_1$ and $t_2$) and, consequently, the determined specific radial distance ($r_1$ to $r_2$) are determined only by the location of the vehicle front 63. Since the vehicle front 63 extends perpendicular to the driving direction 66, the vehicle 6 acts virtually as a point reflector in this region.

Between measurement times $t_2$ and $t_3$ (segment B of the function), the vehicle 6 is already located in an object angle region such that surfaces of the vehicle flank 64 can also be acquired by the radar radiation 11 in addition to the surfaces of the vehicle front 63. It should be noted here that the viewing angle in FIG. 2a is rotated along with the passage of the vehicle 6 around an imaginary vertical axis running through the FMCW radar device 1—comparable to the turning of the head when the vehicle is followed by the eye—so as to make the distribution of rough targets 61 more clearly visible. Actually, the position and orientation of the FMCW radar device 1 and the radar beam 11 coming from the latter remain unchanged relative to the roadway 2 during the entire measurement duration. The first acquisition of rough targets 61 of the vehicle flank 64 adds to the formation of the specific radial distance $r_n$ radial distances which lead to an almost abrupt slight change in the specific radial distance $r_n$ and the temporary segment B in that the specific radial distance $r_n$ decreases slightly less quickly.

Only surfaces of the vehicle flank 64 are acquired by the radar beam 11 between measurement times $t_3$ and $t_4$ (segment C). Leaving aside the effects of the dead zone, the specific position value 62 moves over the vehicle flank 64 in the opposite direction to the driving direction 66 by one half of the vehicle length 1 so that the increase in the specific radial distance $r_n$ is slowed temporarily.

Surfaces of the vehicle rear 65 which reflect the radar radiation 11 and thus contribute to forming the specific position value 62 are increasingly added between measurement times $t_4$ and $t_5$ (segment D).

The transition to a segment E in which only the vehicle rear 65 is reflected is fluid and cannot really be assigned to a time $t_5$ as is shown. The change in the function of the specific position value 62 through the addition of the vehicle rear 65 is minimal in relation to the change in the specific radial distance $r_n$ which is already large.

In comparison, the change in the specific radial distance $r_n$ during the transition of the reflections from the vehicle front 63 to the vehicle flank 64 is noticeable, since the specific radial distance $r_n$ is very small here and cannot be wider than the roadway 2. Also at time $t_4$, the specific radial distance $r_n$ of the vehicle is relatively small so that, in this case too, a change in the function which comes about in that the size of the reflecting vehicle flank 64, as reflecting area, remains virtually the same and the vehicle rear 65 is added to this can be detected quite precisely.

In order to determine the vehicle length 1, conclusions can be drawn according to the first embodiment example about times $t_2$ and $t_4$ by means of the above-described function curve which describes the change over time of the specific position value 62, in this case the specific radial distance $r_n$. The vehicle length 1 is determined based on knowledge of the vehicle speed. The vehicle length 1 is added to the specific radial distance $r_n$ over the entire duration of the passage of the vehicle 6 through the radar lobe 9. The vehicle 6 is then already located at a distance from the FMCW radar device 1 in which the specific object angle $\beta_n$ is very small so that the specific radial distance $r_n$ virtually corresponds to a distance measured parallel to the roadway edge. The sum represents a corrected specific radial distance $r_{corr}$.

Instead of determining the vehicle length 1 computationally, a vehicle model can also be modeled for the vehicle 6 by means of the specific radial distances changing over time and, after normalizing by means of the determined vehicle speed, the vehicle model can be compared with existing comparison models whose vehicle length is known, and the vehicle length 1 is derived by assigning the modeled vehicle model to the comparison model most similar to it. In view of the fact that the front 63 of the vehicle 6 is also detected first by the FMCW radar device 1 rather than the vehicle flank 64 first and then increasingly the vehicle rear 65 as is known in the art, the vehicle model is more precise and therefore can be assigned to the comparison models with greater certainty.

However, the specific object angle $\beta_n$ can also be used instead of the specific radial velocity $r_n$ for determining the vehicle length 1 computationally as well as for determining the vehicle length 1 by comparing with existing comparison models.

The vehicle length 1 as well as the vehicle width b can be determined from the function curve of the specific position values 62, namely, the specific radial velocity $r_n$ or the specific object angle $\beta_n$, by drawing conclusions about the measurement time $t_1$ at which the vehicle front 63 enters the radar lobe 9 and the measurement time $t_2$ at which the vehicle flank 64 starts to reflect radar radiation.

Outside the green-light phase of a traffic signal installation 5, in particular in the red-light phase, it can then be calculated whether or not the vehicle 6 has driven over the stop line 23 with knowledge of the horizontal, vertical distance of the stop line from the FMCW radar device 19, the vehicle speed and the corrected specific radial distance $r_{corr}$. If yes, the camera 4 can be triggered, e.g., before, during and/or after the stop line is crossed.

Figure 3:
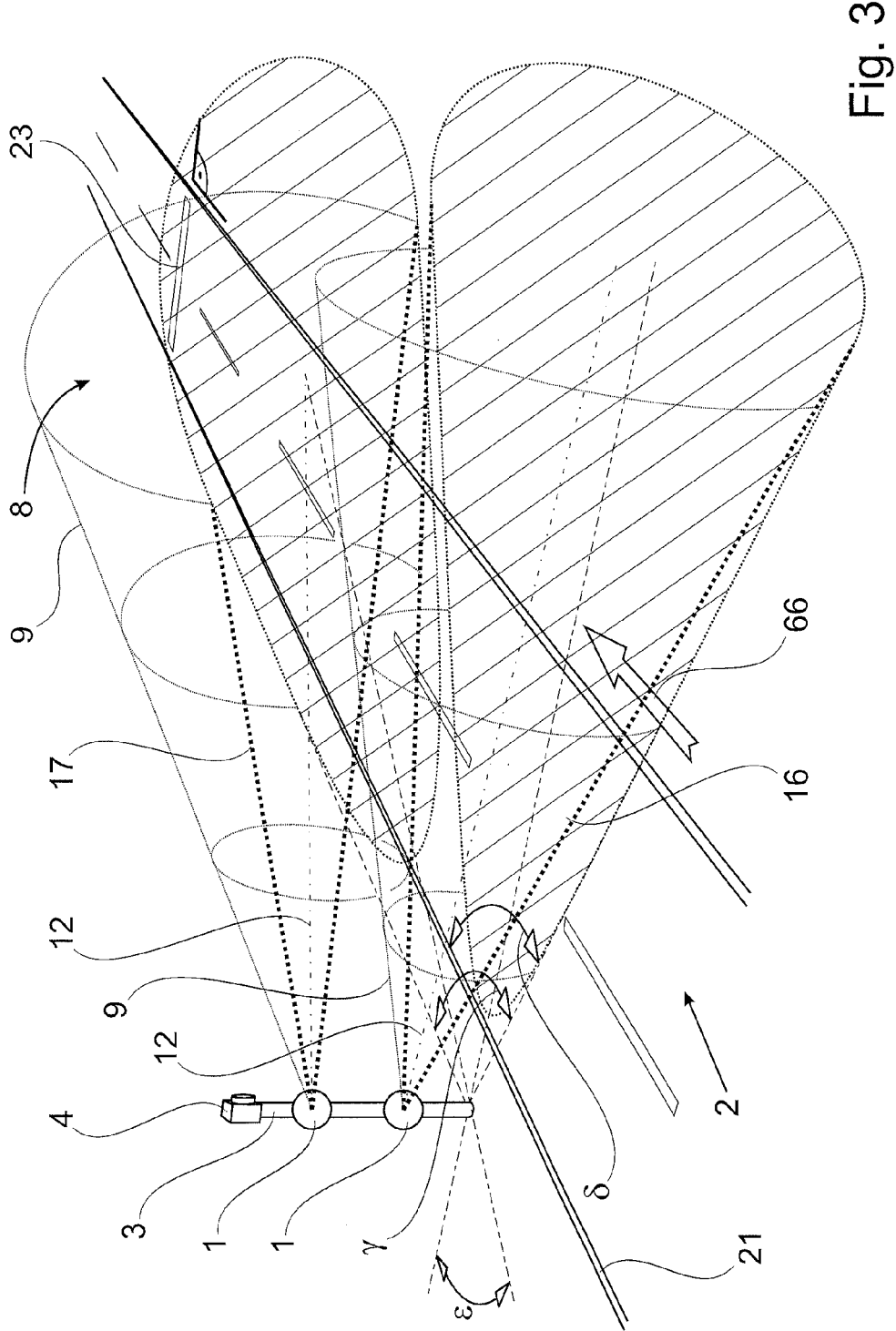
FIG. 3 is a schematic diagram for a second embodiment example of a device in which the observation space is covered by radar radiation coming from two radar sensors.

In a further embodiment of the device according to the invention, a FMCW radar device 1 with a plurality of radar sensors 7, e.g., two radar sensors 7, is used instead of a FMCW radar device 1 with only one radar sensor 7. A device of this kind is shown schematically in FIG. 3. In this case, the radar radiation 11 forms a plurality of radar lobes 9. The radar axes 12 of the radar lobes 9 are then rotated horizontally by an angular offset $\epsilon$ relative to one another so that the outer edge beams 16, 17 are formed by edge beams of different radar sensors 7. The radar lobes 9 formed by the radar sensors 7 can overlap one another so that the observation space 8 is completely covered as with an individual radar sensor 7. The advantage here consists only in that, instead of a radar sensor 7 with a very large aperture angle $\gamma$, two radar sensors 7 with an aperture angle $\gamma$ of only one half of the size can be used.

However, the radar lobes 9 need not overlap. They can also be aligned with a distance between them so that they only cover regions (shaded roadway surface in FIG. 3) of the observation space 8 which are relevant for evaluating the function of the position values 62 and therefore only partially cover the observation space 8. This allows an appreciable saving of energy.

A first relevant region is an object angle region which is adjacent to the first outer edge beam 16 and which is large enough that it accounts for the entire vehicle flank 64 of a vehicle 6 passing through at least at a measurement time $t_n$.

A second relevant region is a region which adjoins the second outer edge beam 17 and which comprises the stop line 23 and at least two vehicle lengths l.

The FMCW radar device 1 and the camera 4 are advantageously arranged close to one another, preferably on the same mast 3. If the FMCW radar device 1 includes more than one radar sensor 7, these radar sensors 7 can also be arranged one above the other, next to one another or both.

The method and the device can also be used from the rear and therefore unbeknownst to the driver of the vehicle with desired rear end measurement and recording of a vehicle 6 and in anticipation of or determination of a traffic violation when the traffic violation does not involve a red light infraction in a traffic light zone. For example, a vehicle 6 entering a permanent restricted zone or crossing a stop line without braking can be detected.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the inven-

LIST OF REFERENCE NUMERALS

1 FMCW radar device
11 radar beam
12 radar axis
13 horizontal, perpendicular installation distance from the edge of the roadway
14 vertical, perpendicular installation distance from the surface of the roadway
15 vertical angle of the radar axis to the surface of the roadway
16 first outer edge beam, of the radar radiation
17 second outer edge beam of the radar radiation
18 horizontal, perpendicular distance of the stop line from the FMCW radar device
2 roadway
21 roadway edge
22 roadway surface
23 stop line
3 mast
4 camera
5 traffic signal installation
6 vehicle
61 rough target
62 specific position value
63 vehicle front
64 vehicle flank
65 vehicle rear
66 driving direction
7 radar sensor
8 observation space
9 radar lobe
10 signal processing unit
$t_n$ measurement time
$r_n$ specific radial distance
$r_{corr}$ corrected specific radial distance
$\beta_n$ specific object angle
$\gamma$ aperture angle
$\delta$ obtuse angle
$\alpha$ a vehicle angle
l vehicle length
b vehicle width
$\epsilon$ angular offset
A first segment
B second segment
C third segment
D fourth segment
E fifth segment

What is claimed is:

1. A method for detecting traffic violations by a vehicle in a traffic light zone comprising,
    deriving a measurement time-dependent specific position value and speed of the vehicle by measurement of a rear end of said vehicle at a plurality of measurement times from measurement signals caused by reflection from said vehicle when driving through an observation zone covered by radar radiation,
    determining whether or not a stop line lying within the observation zone and associated with a traffic signal installation was driven over by the vehicle outside of a green-light phase of said traffic signal installation, said determination based on the specific position value which changes over the course of driving through the observation zone and on the vehicle speed, so that, if required, a camera is triggered at least once for producing at least one evidentiary photograph, wherein a FMCW radar device having at least one radar sensor which sends radar radiation at an aperture angle between two outer edge beams and which receives a plurality of measurement signals within a measurement duration at said plurality of said measurement times, and wherein a radial velocity and, as position value, a specific radial distance and a specific object angle can be derived at each measurement time, be positioned and aligned next to a roadway with a roadway edge such that the observation space completely covers the stop line and the first of the two edge beams forms a horizontal, obtuse angle with a segment of the roadway edge extending in driving direction, the vehicle length is derived from the specific position values and is added to the specific radial distance that is determined only from the position of the rear end of the vehicle to an increasing extent as the stop line is approached, and a corrected specific radial distance formed in this way is then used for determining the crossing of the stop line to make a prediction about the front end of the vehicle driving over the stop line.

2. The method according to claim 1, wherein said specific position values are stored as a function over a measurement duration comprising the measurement times, wherein the function has a plurality of segments in which the position values are derived from measurement signals caused over a first segment by reflection only at the vehicle front, over a second segment by reflection at the vehicle front and increasingly at a vehicle flank, over a third segment by reflection only at the vehicle flank, over a fourth segment by reflection at the vehicle flank and the vehicle rear, and over a fifth segment by reflection only at the vehicle rear, the transitions between the second segment and third segment and between the third segment and fourth segment are detected, the length of the third segment is determined, and the length of the vehicle is calculated from the length of the third segment by means of the determined vehicle speed.

3. The method according to claim 1, wherein a vehicle model is modeled from the specific position values and, after normalizing by means of the determined vehicle speed, is compared with existing comparison models whose vehicle length is known, and the vehicle length is derived by assigning the modeled vehicle model to the comparison model most similar to it.

4. The method according to claim 1, wherein the specific position value for each measurement time is formed by calculating a specific value of the radial distances associated with this measurement time.

5. The method according to claim 1, wherein the specific position value for each measurement time is formed by calculating a specific value of the object angle associated with this measurement time.

6. The method according to claim 4 or 5, wherein the specific value represents the arithmetic mean value.

7. Use of a device for carrying out the method according to claim 1, wherein said method comprises the steps of:
    deriving a measurement time-dependent specific position value and speed of the vehicle by measurement of a rear end of said vehicle at a plurality of measurement times from measurement signals caused by reflection from said vehicle when driving through an observation zone covered by radar radiation, and
    determining whether or not a stop line lying within the observation zone and associated with a traffic signal installation was driven over by the vehicle outside of a green-light phase of said traffic signal installation, said determination based on the specific position value which changes over the course of driving through the observation zone and on the vehicle speed, so that, if required, the camera is triggered at least once for producing at least one evidentiary photograph, wherein the FMCW radar device having at least one radar sensor which sends radar radiation at an aperture angle between two outer edge beams and which receives a plurality of measurement signals within a measurement duration at a plurality of said measurement times, and wherein a radial velocity and, as position value, a specific radial distance and a specific object angle can be derived at each measurement time, be positioned and aligned next to a roadway with a roadway edge such that the observation space completely covers the stop line and the first of the two edge beams forms a horizontal, obtuse angle with a segment of the roadway edge extending in driving direction, the vehicle length is derived from the specific position values and is added to the specific radial distance that is determined only from the position of the rear end of the vehicle to an increasing extent as the stop line is approached, and a corrected specific radial distance formed in this way is then used for determining the crossing of the stop line to make a prediction about the front end of the vehicle driving over the stop line, said device comprising the FMCW radar device with at least one radar sensor and the camera, said FMCW radar device configured and is arranged and aligned in such a way at a perpendicular, horizontal installation distance next to an edge of a roadway with a stop line that a radar beam coming from the FMCW radar device and limited by two outer edge beams covers an observation space which completely encloses a stop line on the roadway, the first of the two edge beams forming an obtuse horizontal angle with a portion of the roadway edge extending in driving direction so that the vehicle is acquired initially by measurement of the front end of the vehicle as it drives through the observation space.

8. The use of a device according to claim 7, wherein an aperture angle formed by the two outer edge beams is greater than 90°.

9. The use of a device according to claim 7, wherein the FMCW radar device comprises exactly one radar sensor and the radar radiation forms a radar lobe whose edge beams present the outer edge beams of the radar radiation so that the observation space is completely covered.

10. The use of a device according to claim 7, wherein the FMCW radar device includes a plurality of radar sensors, and the radar radiation forms a plurality of radar lobes which are rotated horizontally by an angular offset relative to one another and which are not all adjacent to one another or which overlap so that energy is conserved in that the observation space is covered in an energy-efficient manner only partially.

* * * * *